(12) United States Patent
Kinoshita (10) Patent No.: US 8,665,359 B2
(45) Date of Patent: Mar. 4, 2014

(54) IMAGE PICKUP APPARATUS IN WHICH IMAGE PICKUP ELEMENT IS MOVABLE IN OPTICAL AXIS DIRECTION

(75) Inventor: Hiroki Kinoshita, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 170 days.

(21) Appl. No.: 13/050,506

(22) Filed: Mar. 17, 2011

(65) Prior Publication Data

US 2011/0228164 A1 Sep. 22, 2011

(30) Foreign Application Priority Data

Mar. 18, 2010 (JP) ................................. 2010-062037

(51) Int. Cl.
*H04N 5/232* (2006.01)
(52) U.S. Cl.
USPC .......................................... 348/357; 348/345
(58) Field of Classification Search
USPC ................................. 348/357, 345
See application file for complete search history.

(56) References Cited

U.S. PATENT DOCUMENTS

| 5,539,491 | A | * | 7/1996 | Toshikatsu et al. | ........... 396/133 |
|---|---|---|---|---|---|
| 5,959,669 | A | * | 9/1999 | Mizoguchi et al. | ........... 348/362 |
| 2002/0191098 | A1 | * | 12/2002 | Oshima | ......................... 348/345 |
| 2008/0079846 | A1 | * | 4/2008 | Ikari | ............................. 348/373 |

FOREIGN PATENT DOCUMENTS

JP 2004-325555 A 11/2004

* cited by examiner

*Primary Examiner* — Usman Khan
(74) *Attorney, Agent, or Firm* — Rossi, Kimms & McDowell LLP (57) ABSTRACT

An image pickup apparatus includes lens barrels 12 and 13 that house an image pickup optical system L1 to L5, an image pickup element 8 that performs a photoelectric conversion of an object image, an image pickup element holding member 10 that is movable in an optical axis direction with respect to the lens barrels, guide bars 15 and 16 that guide a movement of the image pickup element holding member, and adjustment mechanisms 9a and 9b that perform an inclination adjustment of the image pickup element. Ends at an object side of the guide bars are held by the lens barrels, and ends at an image side of the guide bars are held by a cover member 14 that includes an opening 14c to operate the adjustment mechanism from an outside at the opposite side and that is connected with the lens barrels.

11 Claims, 6 Drawing Sheets

IMAGE PICKUP APPARATUS IN WHICH IMAGE PICKUP ELEMENT IS MOVABLE IN OPTICAL AXIS DIRECTION

BACKGROUND OF THE INVENTION

1. Field of the Invention

The present invention relates to an image pickup apparatuses such as a digital camera or a video camera, and more particularly to an image pickup apparatus in which an image pickup element is movable in an optical axis direction.

2. Description of the Related Art

In an image pickup apparatus, an image pickup optical system constituted by a plurality of lens units is housed in a lens barrel to be held, and the shot image data (the output image) is obtained by performing a photoelectric conversion of an object image formed by the image pickup optical system using an image pickup element.

In the image pickup apparatus, due to a manufacturing error or an assembling error of lens units constituting the image pickup optical system or components constituting a lens barrel, any of the lens units may be inclined with reference to an optical axis of the image pickup optical system. In this case, on an imaging surface of the image pickup element, defocusing in an opposite direction of right and left or up and down may occur.

In order to solve such a problem, it is necessary to perform an inclination adjustment of each of the image pickup optical system and the image pickup element with reference to the optical axis (or a surface orthogonal to the optical axis) to perform a focusing on an entire imaging surface (see Japanese Patent Laid-Open No. 2004-325555). Moreover, in the image pickup optical system, it is necessary to perform other optical adjustments such as a decentering adjustment as well as the inclination adjustment. In performing the optical adjustment of the image pickup optical system such as the inclination adjustment or the decentering adjustment, a reference image pickup element for the adjustment that does not have the inclination or the decentering with reference to the optical axis is attached to the lens barrel to perform the optical adjustment of the image pickup optical system while an output image from the reference image pickup element is seen. Then, the reference image pickup element for the adjustment is replaced to an image pickup element for the imaging to perform the inclination adjustment of the image pickup element while an output image of the image pickup element for the imaging is seen.

On the other hand, in some image pickup apparatuses, the image pickup element is moved in the optical axis direction to be able to perform the zooming or focusing operation.

However, in the conventional image pickup apparatus in which the image pickup element is movable in the optical axis direction, the optical adjustment has to be performed in a state where the image pickup optical system and the image pickup element for the imaging that is movable in the optical axis direction, as well as a guide bar that guides the image pickup element in the optical axis direction, are built in the lens barrel. Therefore, as a common image pickup apparatus in which the image pickup element does not move in the optical axis direction, the optical adjustment cannot be performed only by using the image pickup optical system while the reference image pickup element is fixed and it was difficult to improve the adjustment accuracy.

SUMMARY OF THE INVENTION

The present invention provides an image pickup apparatus that is configured so as to perform an optical adjustment only by using an image pickup optical system and an inclination adjustment of an image pickup element with high accuracy in a state where the image pickup element is movable in an optical axis direction.

An image pickup apparatus as one aspect of the present invention includes a lens barrel configured to house an image pickup optical system, an image pickup element configured to perform a photoelectric conversion of an object image formed by the image pickup optical system, an image pickup element holding member configured to be movable in an optical axis direction with respect to the lens barrel, a guide bar configured to guide a movement of the image pickup element holding member in the optical axis direction, and an adjustment mechanism configured to perform an inclination adjustment of the image pickup element held by the image pickup element holding member. An end at an object side of the guide bar is held by the lens barrel, and an end at an image side of the guide bar is held by a cover member that includes an opening to operate the adjustment mechanism from an outside at the image side and that is connected with the lens barrel.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

[Embodiment 1]

Figure 1:
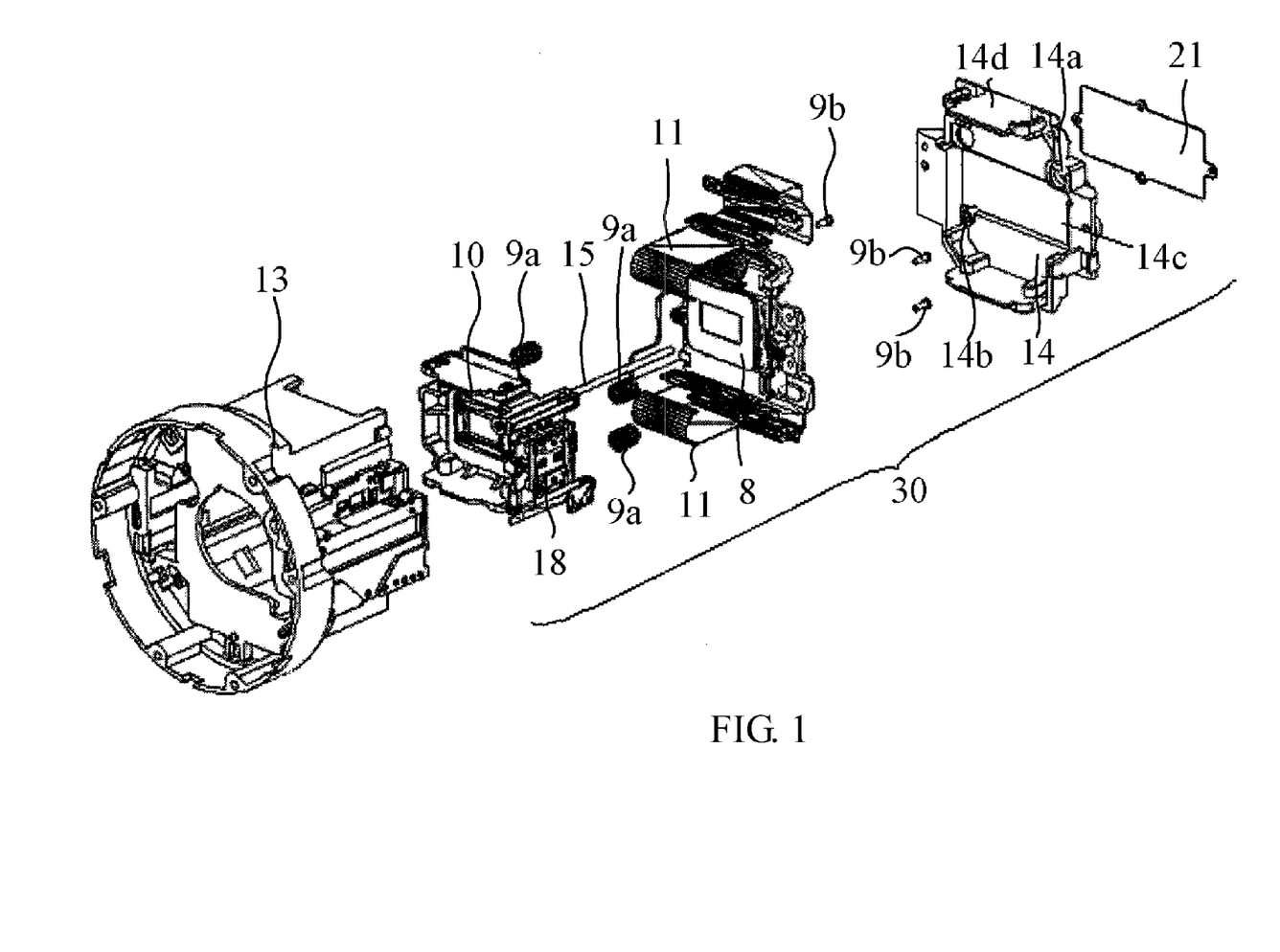
FIG. 1 is an exploded perspective view illustrating a part of a lens barrel in an image pickup apparatus that is Embodiment 1 of the present invention.
Figure 2:
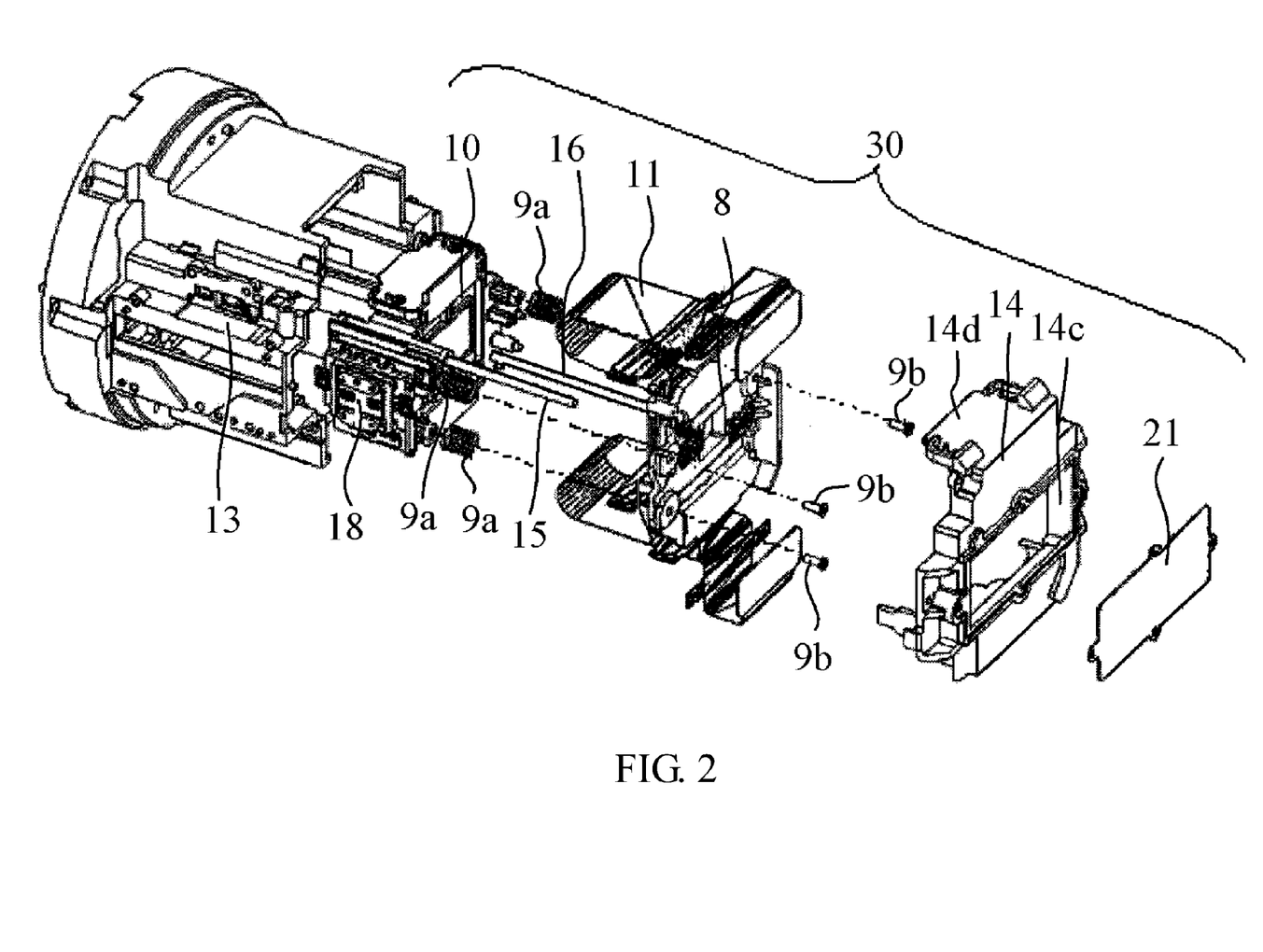
FIG. 2 is an exploded perspective view obtained when a part of the lens barrel illustrated in FIG. 1 is seen from a rear side.
Figure 3:
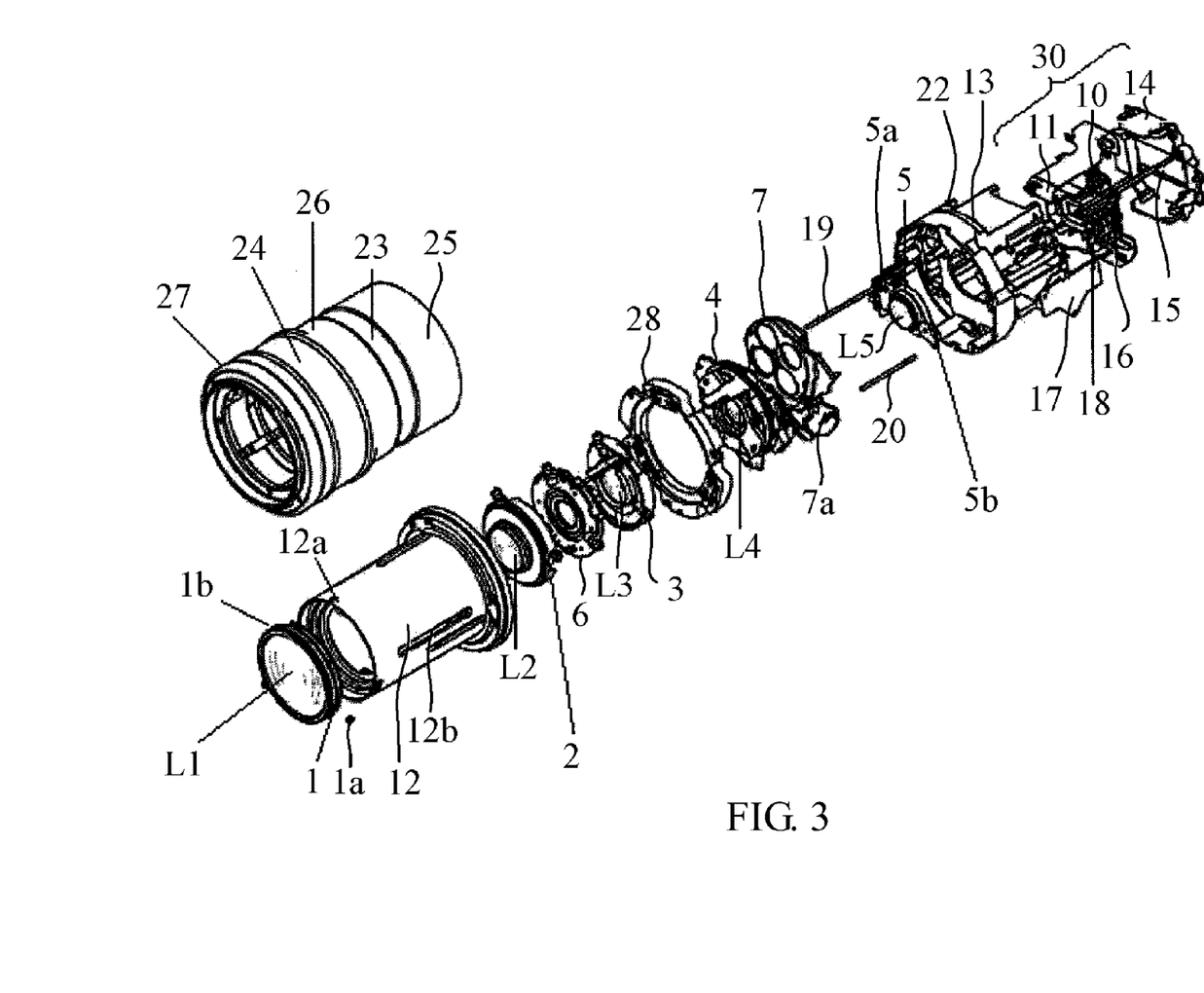
FIG. 3 is an exploded perspective view illustrating the whole of the lens barrel in Embodiment 1.
Figure 4:
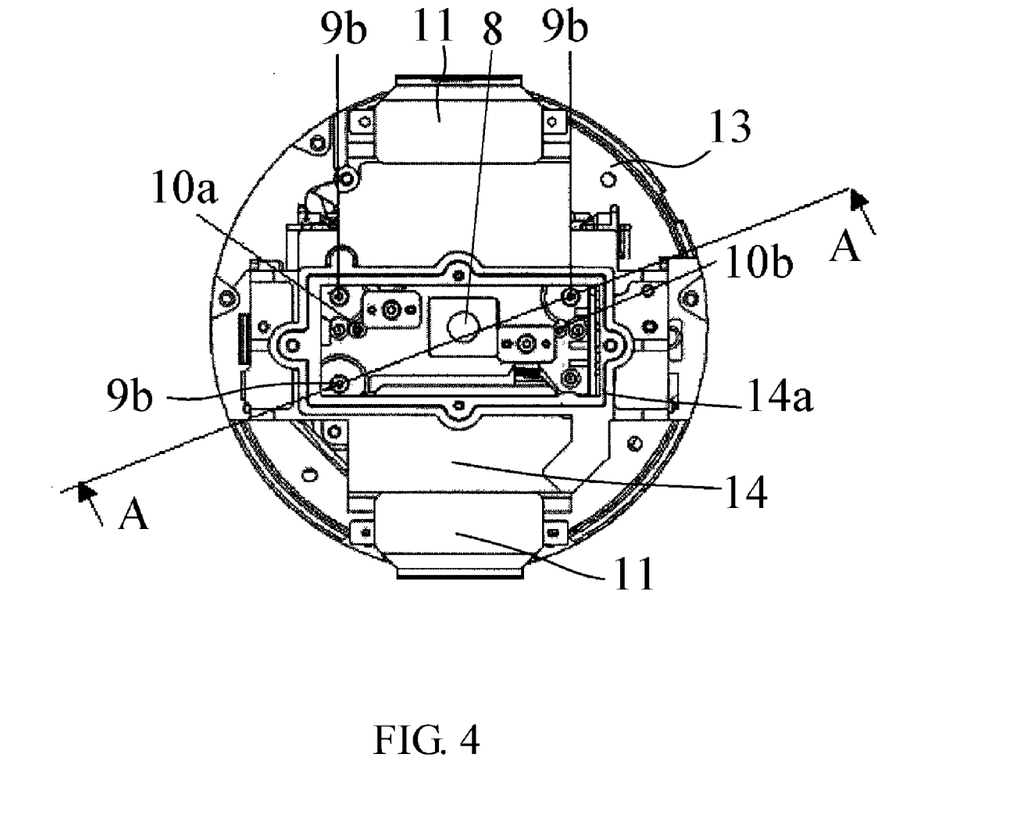
FIG. 4 is a view obtained when the lens barrel in Embodiment 1 is seen from the rear side.
Figure 5:
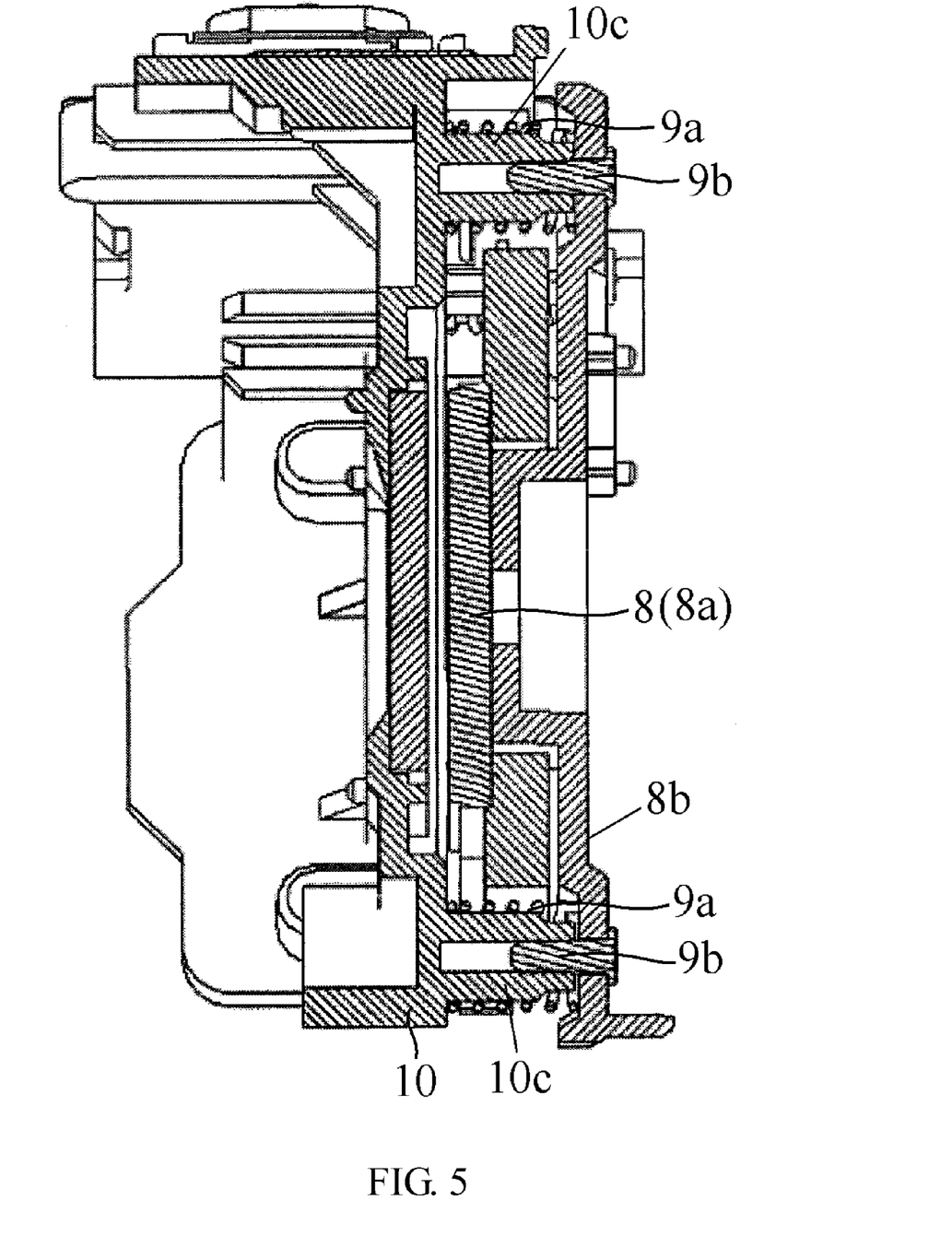
FIG. 5 is a cross-sectional view illustrating a cross section of an A-A line in FIG. 4.

FIG. 3 illustrates an exploded view of the whole configuration of a lens barrel in a video camera as an image pickup apparatus that is Embodiment 1 of the present invention. Moreover, FIGS. 1 and 2 illustrate exploded views of a part relating to a holding mechanism of an image pickup element in the lens barrel. In addition, FIG. 4 illustrates the lens barrel which is obtained when seen from a rear side, and FIG. 5 illustrates a cross section of an A-A line in FIG. 4.

In these drawings, an image pickup optical system including five lens units of convex, concave, convex, concave, and convex sequentially in order from an object side is housed in the lens barrel. In the following descriptions, the object side and the image pickup element side may be referred to as a front side and a rear side, respectively.

In order from the object side that is a left side in FIG. 3, L1 is a fixed first lens unit, and L2 and L3 are second lens unit and third lens unit that move in an optical axis direction to perform a zooming, respectively. L4 is a fourth lens unit that shifts in a direction orthogonal to the optical axis to perform a handshake correction. L5 is a fifth lens unit that moves in the optical axis direction to perform a focusing.

Reference numeral 1 denotes a first holding frame that holds the first lens unit L1. A cam follower 1a attached to an outer circumferential surface 1b of the first holding frame 1 at 120-degree intervals in a circumferential direction engages with an elongate hole 12a formed in a fixed barrel 12 at 120-degree intervals in the circumferential direction. The first holding frame 1 is held on the fixed barrel 12 by fitting the outer circumferential surface 1b into an inner circumferential surface 12b of the fixed barrel 12 and by engaging the cam follower 1a with the elongate hole 12a.

Reference numeral 2 denotes a second moving frame that holds the second lens unit L2, and reference numeral 3 denotes a third moving frame that holds the third lens unit L3. Reference numeral 4 denotes an anti-shake unit that holds the fourth lens unit L4 so as to be able to be shifted in a direction orthogonal to the optical axis. The anti-shake unit 4 is fixed on the fixed barrel 12.

Reference numeral 28 denotes a cam ring retainer plate, which holds oscillators each of which is constituted of an electromechanical energy conversion element that is an actuator rotating a cam ring (not shown) and a planer elastic member in which a vibration is excited by the electromechanical energy conversion element by 120 degrees equally.

Reference numerals 23 and 24 denote zoom ring and focus ring respectively that are operating members to be manually operated from the outside. The zoom ring 23 fits into a zoom ring fixed barrel 25 with its diameter, and is rotatably held between the zoom ring fixed barrel 25 and an intermediate barrel 26 around the optical axis while holding the minimum clearance in the optical axis direction. The focus ring 24 fits into an outer diameter of a focus ring fixed barrel 27 with its diameter, and is rotatably held between the focus ring fixed barrel 27 and the intermediate barrel 26 while holding the minimum clearance in the optical axis direction.

A rotation position detection sensor (not shown) is provided in order to detect an amount of the rotation of each ring at the inner diameter side of the zoom ring 23 and the focus ring 24. These rotation position detection sensors generate signals in accordance with the amounts of rotations of the zoom ring 23 and the focus ring 24 to detect the amount of rotations by performing calculation processes of the signals.

Reference numeral 5 denotes a fifth moving frame that holds the fifth lens unit L5. Reference numeral 8 denotes an image pickup element that is constituted by a CCD sensor, a CMOS sensor, or the like, which performs a photoelectric conversion of an object image (an optical image) formed by light entering the image pickup optical system to output an electric signal. Reference numeral 6 denotes an aperture stop that adjusts a light intensity that reaches the image pickup element 8 from the image pickup optical system. Reference numeral 7 denotes an ND unit that performs four-step exposure switching by the manual operation, which is constituted of an ND base 7a, a transmission filter that is rotatable with respect to the ND base 7a and that has no extinction function, and a turret that holds three ND filters having concentrations different from each other. The ND unit 7 (the ND base 7a) is fixed on a rear barrel 13.

A front end of the rear barrel 13 is connected with a rear surface of the fixed barrel 12. The "barrel" constituting a main body of the lens barrel is configured by the fixed barrel 12 and the rear barrel 13 that are connected with each other.

Reference numeral 30 denotes an image pickup element unit including the image pickup element 8, which is assembled on the back of the rear barrel 13. In the image pickup element unit 30, the image pickup element 8 is moved in the optical axis direction in synchronization with the movement of the second and third lens units L2 and L3 in the optical axis direction to perform the zooming operation. The detail configuration of the image pickup element unit 30 will be described below. The image pickup element 8 may also be moved in the optical axis direction solely or in synchronization with the movement of the fifth lens unit L5 in the optical axis direction to perform the focusing operation.

Reference numerals 19 and 20 denote guide bars whose front ends and rear ends are held by the ND unit 7 (the ND base 7a) and the rear barrel 13, respectively. The guide bar 19 engages with a sleeve 5a formed on the fifth moving frame 5 so as to be movable in the optical axis direction, and thus the movement of the fifth moving frame 5 is guided in the optical axis direction. The guide bar 20 engages with a U-groove 5b formed on the fifth moving frame 5 so as to be moved in the optical axis direction, and thus the rotation of the fifth moving frame 5 around the guide bar 20 is prevented.

Reference numeral 22 denotes a slider (a contacting member) that is constituted by connecting a magnet with a friction material and that is fixed on the rear barrel 13. At a position opposed to the slider 22 on the fifth moving frame 5, an oscillator (not shown) that is constituted of an electromechanical energy conversion element and a planer elastic member in which a vibration is excited by the electromechanical energy conversion element is fixed.

The elastic member of the oscillator is a ferromagnet, and the ferromagnet is attracted by a magnet of the slider 22 to contact a surface of the friction material in the slider 22 with surfaces formed at two regions in the optical axis direction on the elastic member of the oscillator at a pressure.

In a vibration linear actuator constituted by these slider 22 and the oscillator, two frequency signals whose phases are different from each other (pulse signals or alternating signals) are inputted into the electromechanical energy conversion element via a flexible printed wiring board (not shown). As a result, an elliptic motion is generated on the press contact surface of the oscillator, and the driving force is generated on the press contact surface of the slider 22 in order to drive the fifth moving frame 5 in the optical axis direction.

In the lens barrel constituted as described above, when the image pickup optical system is built into the rear barrel 13 and the fixed barrel 12, first of all the fifth moving frame 5 is inserted into the rear barrel 13 from the rear side, and then the guide bars 19 and 20 and the ND unit 7 are inserted into the rear barrel 13 from the object side. Subsequently, the rear ends of the guide bars 19 and 20 are held by the rear barrel 13, and the front ends are held by the ND base 7a fixed on the rear barrel 13. The fixed barrel 12 holding the first holding frame 1, the second moving frame 2 and the third moving frame 3 is connected with the rear barrel 13.

According to the incorporation described above, the lens barrel into which only the image pickup optical system is built without the image pickup element unit 30 is configured.

Next, referring to FIGS. 1, 2, 4, and 5, the image pickup element unit 30 will be described. The image pickup element unit 30 is constituted by the image pickup element 8, an image pickup element holding frame (an image pickup element holding member) 10 that holds the image pickup element 8, guide bars 15 and 16, and a cover member 14. The image pickup element 8 is attached to the image pickup element holding frame 10 via three compression springs 9a and three screws 9b. The three compression springs 9a and the three screws 9b constitute a part of an adjustment mechanism to perform an inclination adjustment of the image pickup element 8 with reference to the image pickup element holding frame 10.

The image pickup element 8 has a sensor (an image pickup part) 8a that performs a photoelectric conversion of the object image and a base 8b on which the sensor 8a is fixed.

Reference numeral 14 denotes a cover member, which includes guide bar holders 14a and 14b, an opening 14c, and an FPC guide 14d. The cover member 14 is connected (fixed) with the rear end of the rear barrel 13.

The front ends (the ends at the object side) of the guide bars 15 and 16 are held by the two guide bar holders formed at two regions of the rear barrel 13, respectively. Moreover, the rear ends of the guide bars 15 and 16 (the ends at the image side opposite to the object side) are held by the guide bar holders 14a and 14b provided on the cover member 14, respectively. The guide bar 15 engages with a sleeve formed on the image pickup element holding frame 10 so as to be movable in the optical axis direction. As a result, the movement of the image pickup element holding frame 10 in the optical axis direction is guided. Moreover, the guide bar 16 engages with a U-groove formed on the image pickup element holding frame 10 so as to be movable in the optical axis direction. As a result, the rotation of the image pickup element holding frame 10 around the guide bar 15 is prevented.

Thus, in the present embodiment, the guide bars 19 and 20 for guiding the fifth moving frame 5 are held by the ND base 7a and the rear barrel 13, and the guide bars 15 and 16 that guide the image pickup element holding frame 10 are held by the rear barrel 13 and the cover member 14. As a result, the image pickup optical system can be built into the lens barrel without assembling the image pickup element 8 (the image pickup element holding frame 10) as described above. Therefore, an optical adjustment only by using the image pickup optical system can be performed by fixing a reference image pickup element for the adjustment onto the rear barrel 13.

Then, the image pickup element unit 30 constituted by the guide bars 15 and 16, the image pickup element holding frame 10 that holds the image pickup element 8, and the cover member 14 is assembled after the optical adjustment is performed. Furthermore, the screw 9b is rotated from the outside behind the cover member 14 via the opening 14c formed on the rear surface of the cover member 14 to be able to adjust the inclination of the image pickup element 8 with reference to the optical axis direction or the surface orthogonal to the optical axis.

FIGS. 4 and 5 illustrate the adjustment mechanism. The positioning of the image pickup element 8 is performed by positioning pins 10a and 10b of the image pickup element holding frame 10 in the direction orthogonal to the optical axis. The three screws 9b are tightened so as to penetrate the base 8b at the three regions of the base 8b of the image pickup element 8, and protrusions extending from the base 8b forward are inserted into holes of a cylinder 10c formed on three regions of the image pickup element holding frame 10 so as to be movable in forward and backward directions.

The three compression springs 9a are arranged on the outer circumference of the three cylinders 10c so as to be positioned between the image pickup element (the base 8b) and the image pickup element holding frame 10, and apply a force to the image pickup element so as to push away from the image pickup element holding frame 10 backward.

A tool (not shown) is inserted from the opening 14c of the cover member 14 connected with the rear barrel 13 to rotate one of the three screws 9b in a loosening direction to displace a part near the rotated screw 9b of the image pickup element 8 in forward and backward direction by the biasing force of the compression spring 9a. In other words, the inclination of the image pickup element 8 with reference to the optical axis or the surface orthogonal to the optical axis is changed. The three or a part of the screws 9b are rotated so as to perform a focusing on an entire screen while imaging data generated using an output signal from the image pickup element 8 is seen to perform the inclination adjustment of the image pickup element 8.

Since the opening 14c is formed on the cover member 14, the inclination adjustment of the image pickup element 8 can be easily performed after the image pickup element unit 30 is built into the lens barrel.

After the inclination adjustment of image pickup element 8 is completed, a light shielding lid 21 that closes the opening 14c is fixed on the cover member 14 by a screw so that outside light does not enter the lens barrel from the opening 14c.

Reference numeral 11 denotes an image pickup element flexible printed circuit board (Hereafter, referred to as an image pickup element FPC) that performs an electric wiring to the image pickup element 8. The electric signal is inputted to and outputted from the image pickup element 8 via the image pickup element FPC 11.

The image pickup element FPC 11 is disposed between the inner circumferential surface of the rear barrel 13 and the outer circumferential surface of the image pickup element holding frame 10, and has a bent part that allows the movement of the image pickup element holding frame 10 in the optical axis direction. The image pickup element FPC 11 is guided so as to extend to the outside of the lens barrel by an FPC guide 14d formed on the cover member 14 so as to extend in the optical axis direction.

Reference numeral 17 denotes a slider (a contacting member) that is constituted by connecting a magnet with a friction material and that is fixed on the rear barrel 13. At a position opposed to the slider 17 on the image pickup element holding frame 10, an oscillator (not shown) that is constituted of an electromechanical energy conversion element and a planer elastic member in which a vibration is excited by the electromechanical energy conversion element is fixed.

The elastic member of the oscillator is a ferromagnet, and the ferromagnet is attracted by a magnet of the slider 17 to contact a surface of the friction material in the slider 17 with surfaces formed at two regions in the optical axis direction on the elastic member of the oscillator at a pressure.

In a vibration linear actuator constituted by these slider 17 and the oscillator 18, two frequency signals whose phases are different from each other (pulse signals or alternating signals) are inputted into the electromechanical energy conversion element via a flexible printed wiring board (not shown). As a result, an elliptic motion is generated on the press contact surface of the oscillator, and the driving force is generated on the press contact surface of the slider 17 in order to drive the image pickup element holding frame 10 in the optical axis direction.

As described above, in the present embodiment, the guide bars 15 and 16 that guide the image pickup element holding frame 10 are held by the rear barrel 13 and the cover member 14 connected with it as a separated member (i.e. at first, it is not connected). As a result, the image pickup element unit 30 can be configured as a different unit from the image pickup optical system, and the optical adjustment only by using the image pickup optical system can be performed by fixing the reference image pickup element for the adjustment in a state where the image pickup optical system is housed in the lens barrel and the image pickup element unit 30 is not assembled.

Then, the image pickup element unit 30 is assembled and the inclination adjustment of the image pickup element 8 is performed via the opening 14c provided on the cover member 14 after the optical adjustment of the image pickup optical system to be able to easily perform the inclination adjustment of the image pickup element 8. Thus, the adjustment accuracies of both the image pickup optical system and the image pickup element 8 can be improved.

Moreover, removing the reference image pickup element for the adjustment and attaching the image pickup element for the imaging can be easily performed without taking the lens barrel apart.

[Embodiment 2]

Figure 6:
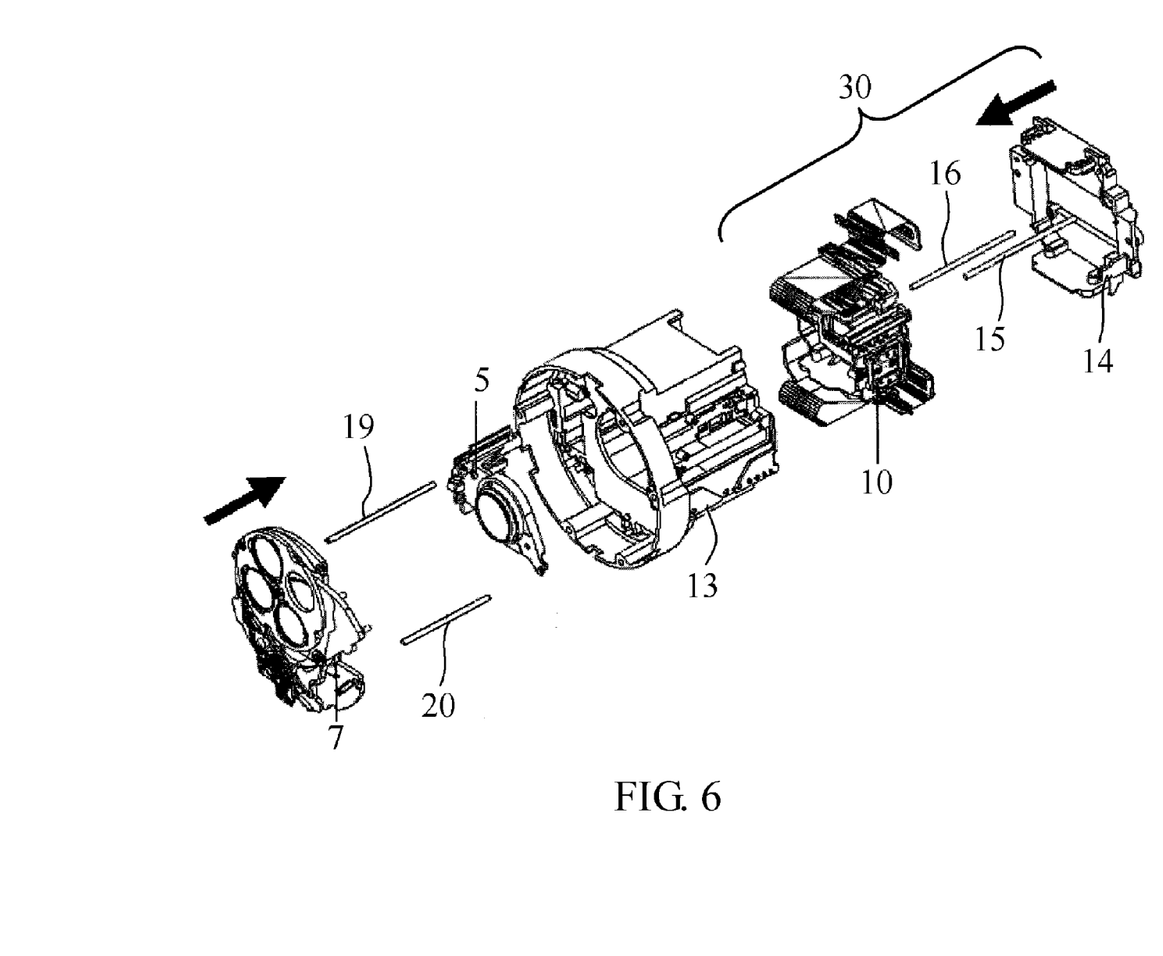
FIG. 6 is an exploded perspective view illustrating a part of the lens barrel in the image pickup apparatus that is Embodiment 2 of the present invention.

FIG. 6 illustrates an exploded view of a part of a lens barrel of a video camera that is Embodiment 2 of the present invention. In the present embodiment, components common to those of Embodiment 1 are denoted by the same reference numerals as those of Embodiment 1.

In the present embodiment, with respect to the rear barrel 13, the firth moving frame 5, the guide bars 19 and 20, and the ND unit 7 are built in order from the front side (the object side). The rear ends of the guide bars 19 and 20 are held by the rear barrel 13, and the front ends are held by the ND unit 7 fixed on the rear barrel 13. On the other hand, the image pickup element unit 30 (the image pickup element 8, the image pickup element holding frame 10, the guide bars 15 and 16, and the cover member 14) is assembled with respect to the rear barrel 13 from the rear side (the side opposite to the object side).

In the present embodiment similarly to Embodiment 1, the image pickup optical system can be built without assembling the image pickup element unit with respect to the lens barrel. Therefore, the optical adjustment only by the image pickup optical system can be easily performed by fixing a reference image pickup element for the adjustment on the rear barrel 13.

After the optical adjustment is performed, the image pickup element unit 30 constituted by the guide bars 15 and 16 and the image pickup element holding frame 10 that holds the image pickup element 8 and the cover member 14 is assembled in the rear barrel 13. As a result, the inclination of the image pickup element 8 with reference to the optical axis or the surface orthogonal to the optical axis can be adjusted by operating an adjustment mechanism that is similar to that of Embodiment 1 through the opening formed on the rear surface of the cover member 14.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-062037, filed on Mar. 18, 2010, which is hereby incorporated by reference herein in its entirety.

Parts List
L1 First Lens Unit
L2 Second Lens Unit
L3 Third Lens Unit
L4 Fourth Lens Unit
L5 Fifth Lens Unit
1 First Holding Frame
1a Cam Follower
1b Outer Circumferential Surface of the First Holding Frame 1
2 Second Moving Frame
3 Third Moving Frame
4 Anti-shake Unit
5 Fifth Moving Frame
5a Sleeve
5b U-groove
6 Aperture Stop
7 ND Unit
7a ND Base
8 Image Pickup Element
8a Sensor
8b Base
9a Compression Spring
9b Screw
10 Image Pickup Element Holding Member
10a Positioning Pin
10b Positioning Pin
10c Cylinder
11 Image Pickup Element Flexible Printed Circuit ("FPC") Board
12 Fixed Barrel
12a Elongate Hole
12b Inner Circumferential Surface
13 Rear Barrel
14 Cover Member
14a Guide Bar Holder
14b Guide Bar Holder
14c Opening
14d FPC Guide
15 Guide Bar
16 Guide Bar
17 Slider (a Contacting Member)
18 Oscillator
19 Guide Bar
20 Guide Bar
21 Light Shielding Lid
22 Slider (a Contacting Member)
23 Zoom Ring
24 Focus Ring
25 Zoom Ring Fixed Barrel
26 Intermediate Barrel
27 Focus Ring Fixed Barrel
28 Cam Ring Retainer Plate
30 Image Pickup Element Unit

What is claimed is:

1. An image pickup apparatus comprising:
a lens barrel configured to house an image pickup optical system;
an image pickup element configured to perform a photoelectric conversion of an object image formed by the image pickup optical system;
an image pickup element holding member configured to be movable in an optical axis direction with respect to the lens barrel;
a guide bar configured to guide a movement of the image pickup element holding member in the optical axis direction;
an adjustment mechanism configured to perform an inclination adjustment of the image pickup element held by the image pickup element holding member, the adjustment mechanism including screws attached to the image pickup element holding member that are operable for the inclination adjustment; and
a cover member that includes an opening through which the screws are operated from an outside at an image side and that is connected with the lens barrel, the cover member further including an image side guide bar holder,
wherein the lens barrel includes an object side guide bar holder, and an end at an object side of the guide bar is held by the object side guide bar holder of the lens barrel, and wherein an end at the image side of the guide bar is held by the image side guide bar holder of the cover member.

2. The image pickup apparatus according to claim 1,
wherein the image pickup optical system is built into the lens barrel from the object side, and
wherein the guide bar and image pickup element holding member are built into the lens barrel from the image side.

3. The image pickup apparatus according to claim 1, further comprising another guide bar which is other than the guide bar,
wherein the other guide bar prevents the rotation of the image pickup element holding member when the image pickup element holding member moves in the optical axis direction.

4. The image pickup apparatus according to claim 1, wherein the image pickup optical system includes a first lens unit of positive refractive power, a second lens unit of negative refractive power, a third lens unit of positive refractive power, a fourth lens unit of negative refractive power, and a fifth lens unit of positive refractive power in order from the object side.

5. The image pickup apparatus according to claim 4,
wherein the first lens unit does not move for zooming,
wherein the second lens unit and the third lens unit move in the optical axis direction during zooming,
wherein the fourth lens unit moves in a direction orthogonal to the optical axis so as to perform a hand-shake correction, and
wherein the fifth lens unit moves in the optical axis direction during focusing.

6. The image pickup apparatus according to claim 1, wherein the image pickup element moves in the optical axis direction during zooming.

7. The image pickup apparatus according to claim 1, wherein the image pickup element moves in the optical axis direction during focusing.

8. The image pickup apparatus according to claim 1,
wherein the image pickup element is attached to the image-pickup element holding member via three compression springs and three screws, and
wherein the adjustment mechanism includes the three compression springs and the three screws.

9. The image pickup apparatus according to claim 1, wherein the lens barrel is configured to allow an optical adjustment of the image pickup optical system housed therein by using a reference image pickup element attached to the lens barrel, before the image pickup element holding member and the cover member are assembled to the lens barrel and before the inclination adjustment of the image pickup element is performed.

10. A method of manufacturing an image pickup apparatus comprising:
housing an image pickup optical system in a lens barrel;
performing an adjustment of the image pickup optical system; and
building an image pickup unit into the lens barrel,
wherein the image pickup unit comprises:
an image pickup element configured to perform a photoelectric conversion of an object image formed by the image pickup optical system;
an image pickup element holding member configured to be movable in an optical axis direction with respect to the lens barrel;
a guide bar configured to guide a movement of the image pickup element holding member in the optical axis direction, an end at an object side of the guide bar being held by the lens barrel;
an adjustment mechanism configured to perform an inclination adjustment of the image pickup element held by the image pickup element holding member, the adjustment mechanism including screws attached to the image pickup element holding member that are operable for the inclination adjustment; and
a cover member that includes an opening through which the screws are operated from an outside at an image side and that is connected with the lens barrel, the cover member further including an image side guide bar holder,
wherein the lens barrel includes an object side guide bar holder, an end at an object side of the guide bar is held by the object side guide bar holder of the lens barrel, and an end at the image side of the guide bar is held by the image side guide bar holder of the cover member, and
wherein the method further comprises performing the inclination adjustment of the image pickup element from the outside at the image side through the opening.

11. The method according to claim 10, wherein the method further comprises performing, before assembling the image pickup element holding member and the cover member to the lens barrel and before performing the inclination adjustment of the image pickup element, an optical adjustment of the image pickup optical system housed in the lens barrel by using a reference image pickup element attached to the lens barrel.

* * * * *